US012767217B2

(12) United States Patent
Becker

(10) Patent No.: US 12,767,217 B2
(45) Date of Patent: Oct. 20, 2026

(54) CONTROL UNIT FOR A CONTROL SYSTEM OF A VEHICLE, STEERING ACTUATOR FOR A VEHICLE, VEHICLE, METHOD FOR A CONTROL SYSTEM OF A VEHICLE, AND COMPUTER PROGRAM

(71) Applicant: ZF CV Systems Global GmbH, Bern (CH)

(72) Inventor: Ingo Becker, Linnich (DE)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 73 days.

(21) Appl. No.: 18/830,739

(22) Filed: Sep. 11, 2024

(65) Prior Publication Data

US 2025/0083738 A1 Mar. 13, 2025

(30) Foreign Application Priority Data

Sep. 13, 2023 (DE) ..................... 10 2023 124 705.0

(51) Int. Cl.
*B62D 5/04* (2006.01)

(52) U.S. Cl.
CPC .................................. *B62D 5/0493* (2013.01)

(58) Field of Classification Search
CPC .......................... B62D 5/0493; B60R 16/0232
USPC ............................................................ 701/41
See application file for complete search history.

(56) References Cited

U.S. PATENT DOCUMENTS

| | | | | |
|---|---|---|---|---|
| 7,750,501 | B2 | 7/2010 | Huang | |
| 9,707,913 | B1 * | 7/2017 | Ochiai | B60R 16/037 |
| 2019/0344735 | A1 * | 11/2019 | Granig | G01R 31/007 |
| 2020/0192587 | A1 * | 6/2020 | Lee | G06F 13/1678 |
| 2021/0164809 | A1 | 6/2021 | Kapser et al. | |
| 2023/0104950 | A1 | 4/2023 | Itten et al. | |
| 2024/0267318 | A1 | 8/2024 | Fellhauer et al. | |

FOREIGN PATENT DOCUMENTS

| | | | |
|---|---|---|---|
| DE | 102019132278 | A1 | 6/2021 |
| DE | 102020204036 | A1 | 9/2021 |
| DE | 102021208994 | A1 | 2/2023 |

* cited by examiner

*Primary Examiner* — Yi-Kai Wang
(74) *Attorney, Agent, or Firm* — LEYDIG, VOIT & MAYER, LTD.

(57) ABSTRACT

A control unit for a control system of a vehicle, including a first interface, a second interface, and a data processing circuit. The data processing circuit is configured to control the first interface and the second interface, transmit a verification signal, wherein the verification signal is indicative of a verification parameter, and receive the verification parameter. The verification signal is transmitted via the first interface and the verification parameter is received via the second interface.

14 Claims, 8 Drawing Sheets

CONTROL UNIT FOR A CONTROL SYSTEM OF A VEHICLE, STEERING ACTUATOR FOR A VEHICLE, VEHICLE, METHOD FOR A CONTROL SYSTEM OF A VEHICLE, AND COMPUTER PROGRAM

CROSS REFERENCE TO RELATED APPLICATIONS

This application claims benefit to German Patent Application No. DE 10 2023 124 705.0, filed on Sep. 13, 2023, which is hereby incorporated by reference herein.

FIELD

The present invention relates to a control unit for a control system of a vehicle, to a steering actuator for a vehicle, to a vehicle, to a method for a control system of a vehicle, and to a computer program.

BACKGROUND

Today's control systems require a high safety integrity level (ASIL) and therefore design-specific measures such as redundant chains of subcomponents, signal paths and functional paths. Such systems and even subsystems are often designed with insufficient protection against manipulations in the sense of cyber security (hardware and software protection). Particularly wiring harness connections are poorly protected and pose a risk of signal manipulation after a connector has been released.

For example, a communication path is based on a bidirectional bus system (SENT=single edge nibble transmission, with address-synchronized communication as follows (simplified)). In the event of "manipulation of steering behavior", the connector of a redundant signal connection could be released so that a trigger sensor signal could be read out of the control system and a manipulated signal could be induced into the control system by the open connector making contact with an external hardware component (for example a signal generator). Depending on the internal diagnostics of the control system, this modification may remain undetected and lead to safety-critical faults.

SUMMARY

In an embodiment, the present disclosure provides a control unit for a control system of a vehicle, comprising a first interface, a second interface, and a data processing circuit. The data processing circuit is configured to control the first interface and the second interface, transmit a verification signal, wherein the verification signal is indicative of a verification parameter, and receive the verification parameter. The verification signal is transmitted via the first interface and the verification parameter is received via the second interface.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
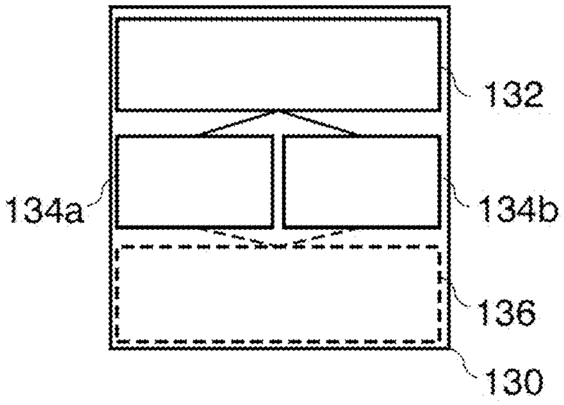
FIG. 1 illustrates a block diagram of an exemplary embodiment of a control unit for a control system of a vehicle.

In an embodiment, the present invention enables improved monitoring of a control system.

The foregoing is achieved by a control unit for a control system of a vehicle, a steering actuator for a vehicle, a vehicle, a method for a control system of a vehicle, and a computer program in accordance with the present disclosure.

A first aspect of the present disclosure provides a control unit for a control system of a vehicle. The control unit comprises a first interface and a second interface. The control unit furthermore comprises a data processing circuit which is designed to control the first interface and the second interface. The data processing circuit is furthermore designed to transmit a verification signal indicative of a verification parameter and to receive the verification parameter. The verification signal is transmitted via the first interface and the verification parameter is received via the second interface. The first interface and the second interface are two separate interfaces. Transmitting the verification signal via the first interface and receiving the verification parameter via the second interface mean that a correct contact-connection of the first interface and the second interface can be verified. For example, the control unit can determine a specific assignment of the first interface and the second interface for transmitting the verification signal and receiving the verification parameter. Accordingly, the control unit can transmit the verification signal specifically via the first interface and expect reception of the verification parameter via the second interface. If a manipulation is carried out, for example an external hardware component is connected to the first interface or the second interface, the external hardware component may lack information about which interface is to be used to transmit the verification parameter. Accordingly, a possible manipulation, for example connection of an external device, can be determined, provided that the verification parameter is not received via the second interface.

In an exemplary embodiment, the data management circuit can be designed to deactivate a part of the control system if the verification parameter is not received via the second interface within a predefined time after transmission. Deactivating a part of the control system can prevent misuse. For example, it is possible to prevent data from being read and/or imported from that part of the control system.

In an exemplary embodiment, the first interface and the second interface can be comprised by an interface module. The control unit can furthermore comprise a further interface module comprising a further interface. The data management circuit can be designed to transmit a further verification signal indicative of a further verification parameter via the further interface. Furthermore, the data management circuit can be designed to receive the further verification parameter via the interface module. The first interface and the second interface can be comprised by a hardware component, for example a connector. For example, the hardware component can include two pins, that is to say the first interface and the second interface. For example, redundancy in the signal transmission can be established by using a further interface module. Protection against manipulation can be improved based on this redundancy. In particular, it is possible to verify whether a large number of interface modules have not been manipulated. Reception of the further verification parameter via the interface module makes it possible in particular to verify whether the further interface module is connected correctly. In the event of a manipulation of the further interface module, for example removal of a connector from the further interface module, the further checking parameter can no longer be received via the interface module. The use of the further interface module and the interface module can therefore improve the security of the control system.

In an exemplary embodiment, the further verification parameter can be received via the second interface or a third interface. For example, the further verification parameter can be received together with the verification parameter via the second interface of the interface module. This can simplify the configuration of the interface module. As an alternative, the further verification parameter can be received via a third interface of the interface module. In particular, the control unit can determine an assignment of the third interface for receiving the further verification parameter. This enables the control unit to verify whether the further verification parameter has been received via the correct interface. This can increase the security of the control system.

In an exemplary embodiment, the part of the control system that correlates to the verification parameter or the further verification parameter can be deactivated if the verification parameter or the further verification parameter is not received via the interface module within a predefined time after transmission. This enables a part of the control system to be disconnected selectively. For example, the control unit cannot receive the further verification parameter and can selectively deactivate the part of the control system connected to the further interface module.

In an exemplary embodiment, the data management circuit can be designed to enable data transmission of sensor data via the interface module only after reception of the verification parameter. This can ensure that information is not exchanged until the security of the connection has been verified.

A second aspect of the present disclosure provides a steering actuator for a vehicle comprising a control unit as described above. The control unit can thus be comprised by a steering actuator, for example a steering axle or a steering wheel. This can improve the security of the configuration of a vehicle's on-board electrical system.

A third aspect of the present disclosure provides a vehicle having a control unit as described above or a steering actuator as described above. In the case of a vehicle, the control unit has the advantage that the security of a vehicle's on-board electrical system can be increased.

A fourth aspect of the present disclosure provides a method for a control unit for a control system of a vehicle. The method comprises transmission of a verification signal via a first interface, the verification signal being indicative of a verification parameter. The method also comprises reception of the verification parameter via a second interface. The first interface is different from the second interface.

A fifth aspect of the present disclosure provides a computer program. The computer program is for carrying out a method described above when the computer program runs on a computer, a processor, or a programmable hardware component.

The present disclosure is to be described in the following text purely by way of example with reference to the accompanying figures.

FIG. 1 shows a block diagram of an exemplary embodiment of a control unit 130 for a control system of a vehicle. The control unit 130 comprises a first interface 134*a* and a second interface 134*b*. The control unit 130 furthermore comprises a data processing circuit 132 which is designed to control the first interface 134*a* and the second interface 134*b*. The data processing circuit 132 is furthermore designed to transmit a verification signal indicative of a verification parameter.

The verification signal can be based on a request signal exchanged as standard between a control unit and another component of the vehicle. For example, in some communication protocols, in particular those based on a request-response basis, a type of coding or identification code can be transmitted with it. This coding or the identification code can be used to identify a request and to ensure that the component, for example a sensor, and/or the control unit are exchanging the correct data.

A control unit can transmit a request, that is to say a request signal, to a particular sensor. This request can be a particular query for specific data required by the control unit. The request can include a coding or identification code that indicates which sensor the request concerns and what type of data is expected. The sensor can receive the request, decrypt it, evaluate the identification code and determine which data are requested. The sensor can then respond with the requested data, which can also be coded or in a specific format. This form of transfer can be used in particular in bidirectional bus systems.

The verification signal can extend a request signal to include the verification parameter. For example, the verification signal includes a request signal from the prior art and the verification parameter. In particular, the verification parameter may not be a coding of a request for data. The verification parameter can be used solely to verify the connectivity between the control unit 130 and another component, for example a sensor. The verification parameter may not be associated with the request for data. The control unit 130 can thus receive via the second interface 134*b* the same verification parameter that was transmitted via the first interface 134*a*.

Accordingly, the data processing circuit 134 is furthermore designed to receive the verification parameter. A verification parameter can be a value, an identifier or a data structure. The verification parameter can be used in a communication process to verify the integrity, correctness and/or authenticity of a connection. The verification parameter can be used to verify a correct connection between the control unit 130 and another component of the vehicle.

The verification signal is transmitted via the first interface 134*a* and the verification parameter is received via the second interface 134*b*. The first interface 134*a* and the second interface 134*b* are two separate interfaces.

The verification signal and the verification parameter can thus be used in particular to verify a hardware configuration of the control unit 130 or of the control system. For example, the control unit 130 can be used to identify whether a component of the control system connected to the control unit 130, for example an on-board electrical system, of a vehicle has been removed from the control unit 130. For example, a release or removal of a connector (for example by removing a wiring harness) can be detected by means of the control unit 130. Detecting a release of a connector can help to increase the security of the vehicle or the control system of the vehicle. In particular, a hardware-based manipulation can be made more difficult. The control unit 130 can be used to identify decoupling of a connection system, for example a wiring harness. Furthermore, access to the control unit 130 using manipulated signals can be prevented.

The control unit 130 can build on the existing signal path structure and the existing information exchange process as described with reference to FIG. 2. In particular, the existing signal path structure uses only one interface for information exchange. One finding of the present disclosure is that an additional signal line, the second interface 134*b*, and the use of a verification parameter can increase the security of the control system of the vehicle. In particular, specific processor sense ports can be used for external and internal checks of the verification parameter, as shown with reference to FIG. 3. For example, the second interface 134*b* can be specified to receive the verification parameter. The interfaces 132*a*, 132*b* of the control unit 130 can thus be specified to transmit the verification signal or to receive the verification parameter and/or the further verification parameter.

The use of the control unit 130 can particularly protect wiring harness paths of a vehicle that are connected to other components (for example a steering sensor, a steering actuator, an ambient sensor). This ensures fault-tolerant performance with secure data transfer. In particular, fault-tolerant, redundant performance with secure data transfer can be ensured by using the further verification parameter.

In one exemplary embodiment, the data management circuit 134 can be designed to deactivate a part of the control system if the verification parameter is not received via the second interface within a predefined time after transmission. For example, the part of the control system that belongs to the control unit 130 can be deactivated. This means that the control unit 130 can be at least partially deactivated. As an alternative, the control unit 130 can be completely deactivated. Optionally or alternatively, a further control unit of the control system can be at least partially deactivated based on the at least partial deactivation of the control unit 130. For example, the further control unit can be responsible for the same processes or can handle the same processes as the control unit 130. This means that the further control unit can be a redundant control unit in relation to the control unit 130. If a possible manipulation of the control unit 130 is detected, the redundant further control unit can also be at least partially, in particular completely, deactivated as a precaution. This can increase the security of the control system.

In an exemplary embodiment, the first interface 134*a* and the second interface 134*b* can be comprised by an interface module. The interface module can be a hardware-based component. The first interface 134*a* and the second interface 134*b* can converge in the interface module. For example, the interface module can include a housing for the first interface and the second interface. Releasing the interface module can simultaneously release the first interface 134*a* and the second interface 134*b*. For example, the interface module can be a connector, for example a bus connector, a plug-in connector and/or a hybrid plug-in connector.

The control unit 130 can furthermore comprise a further interface module comprising a further interface. The further interface module can be formed separately from the interface module. This means that the interface module can be a first hardware component and the further interface module can be a second hardware component. The interface module and the further interface module can be connected separately to the control system of the vehicle.

The data management circuit 134 can be designed to transmit a further verification signal indicative of a further verification parameter via the further interface. Furthermore, the data management circuit 134 can be designed to receive the further verification parameter via the interface module. Transmitting a further verification signal via the further interface module makes it possible to verify a correct connection of the interface module and/or the further interface module.

Optionally or alternatively, the control unit 130 can be used to detect a defect in the first interface 134*a* and/or the second interface 134*b*. For example, the first interface 134*a* can be a connector pin that is no longer functional and is assigned to receiving the verification parameter. In a redundant arrangement, the control unit 130 could then still receive the further verification parameter but no longer receive the verification parameter. Receiving only the further verification parameter could thus be indicative of a malfunction of the first interface 134*a*.

By using the further verification parameter, the control unit 130 can thus verify the individual interfaces at least partially independently of one another. For example, the control unit 130 can receive only the further verification parameter via the second interface 134*b*. This enables the control unit 130 to determine that the first interface 134*a* via which the first verification parameter is transmitted could not be functioning correctly. The control unit 130 could thus selectively detect a failure of an interface.

Using the further verification parameter can maintain a fault-tolerant strategy for a redundant signal path. Furthermore, the redundancy of the control system can be maintained in "normal" operating mode.

In an exemplary embodiment, the further verification parameter can be received via the second interface 134*b* or a third interface. For example, the further verification parameter can be connected to the verification parameter by multiplexing and simultaneously received via the second interface 134*b*. As an alternative, a third interface of the control unit 130 can be used to receive the further verification parameter. For example, the third interface can be a specific processor sense port for receiving the further verification parameter. In this case, the second interface 134*b* can be a specific processor sense port for receiving the verification parameter.

In an exemplary embodiment, the part of the control system that correlates to the verification parameter or the further verification parameter can be deactivated if the verification parameter or the further verification parameter is not received via the interface module within a predefined time after transmission. This means that control unit 130 can be at least partially deactivated if the verification parameter or the further verification parameter is not received. As an alternative, the control unit 130 can be completely deactivated.

In an exemplary embodiment, the data management circuit 134 can be designed to enable data transmission of sensor data via the interface module only after reception of the verification parameter. This can ensure that information is not exchanged until the security of the connection has been verified.

As shown in FIG. 1, the interface 134 can be coupled to the respective data processing circuit 132 of the control unit 130. In examples, the control unit 130 can be implemented by one or more processing units, one or more processing devices, any means for processing, such as a processor, a computer or a programmable hardware component, for example, that can be operated with appropriately adapted software. Likewise, the described functions of the data processing circuit 132 can also be implemented in software which is then executed on one or more programmable hardware components. Such hardware components can be a multi-purpose processor, a digital signal processor (DSP), a microcontroller, etc. The data processing circuit 132 can be able to control the interface 134 so that any data transfer made via the interface 134 and/or any interaction in which the interface 134 can be involved can be controlled by the data processing circuit 132.

In an embodiment, the control unit 130 can comprise a memory 136 and at least one data processing circuit 132 which is functionally coupled to the memory 136 and configured to carry out the method described below.

In examples, the interface 134 can correspond to any means of obtaining, receiving, transferring or providing analog or digital signals or information, for example any terminal, contact, pin, register, input terminal, output terminal, conductor, track, etc., that allows the provision or obtaining of a signal or a piece of information. The interface 134 can be wireless or wired and can be configured to be able to communicate with other internal or external components, for example can transmit or receive signals or information.

Even if the exemplary embodiments describe that the verification signal also includes data other than the verification parameter, the verification signal is not restricted to this. As an alternative, the verification signal may not be based on a request signal of the prior art. For example, the verification signal may only include the verification parameter. This means that the verification parameter can be transmitted separately from other data, for example a data request.

The control unit can be a central control device of a vehicle or can be comprised thereby.

FIGS. 2*a*-2*e* show a signal path structure and an existing information exchange process from the prior art.

Figure 2A:
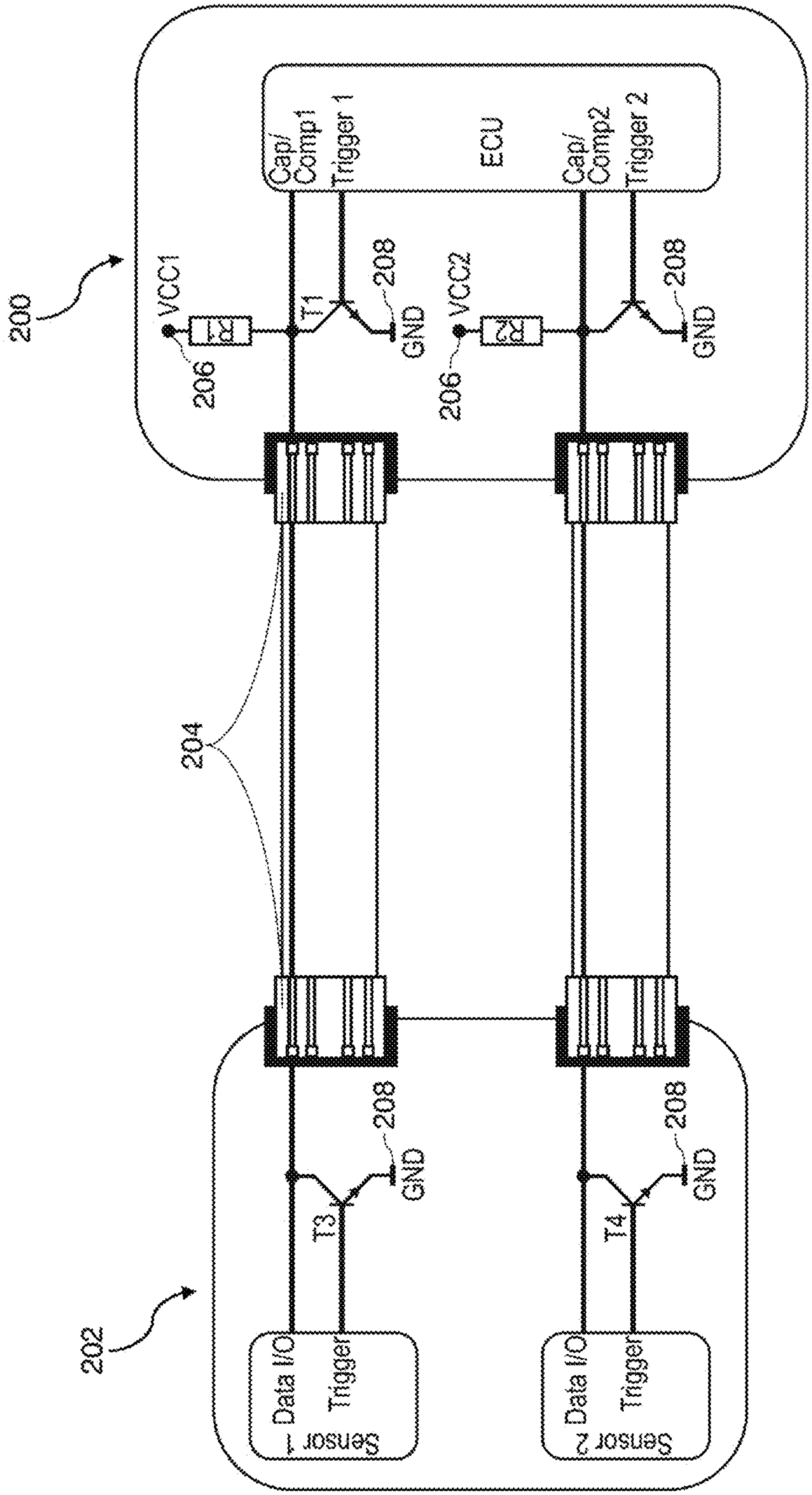
FIGS. 2*a*-2*e* illustrate a signal path structure and an existing information exchange process from the prior art.

FIG. 2*a* illustrates a basic configuration of an on-board electrical system of a vehicle, known from the prior art. The on-board electrical system comprises a control device 200 (also known as an electronic control unit, ECU), a sensor system 202, and connecting elements 204. FIG. 2*a* shows a redundant sensor system, corresponding to the prior art, in conjunction with a redundant connection system with the control device 200. Only the signal transmission, power supply 206 and ground (GND) connections 208 are shown for the purpose of illustration.

Figure 2B:

As can be seen in FIG. 2*b*, the signal path is based on a modern bidirectional bus system (SENT=single edge nibble transmission, with address-synchronized communication). The signal can be in the form of a request signal.

Figure 2C:
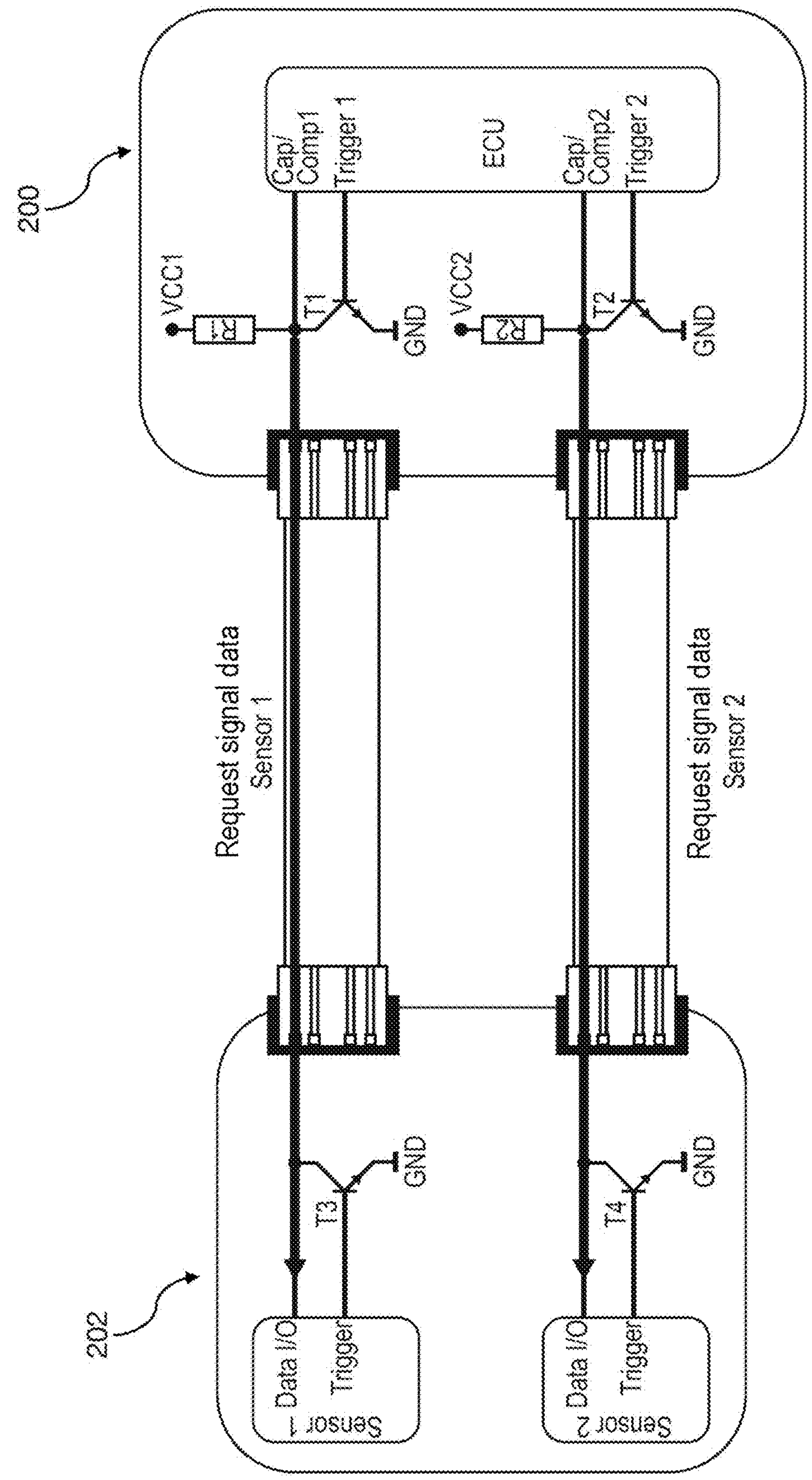

FIG. 2*c* shows a data request by the control device 202, enabled by a first or second trigger event. The data request is intended for a first sensor or a second sensor.

Figure 2D:
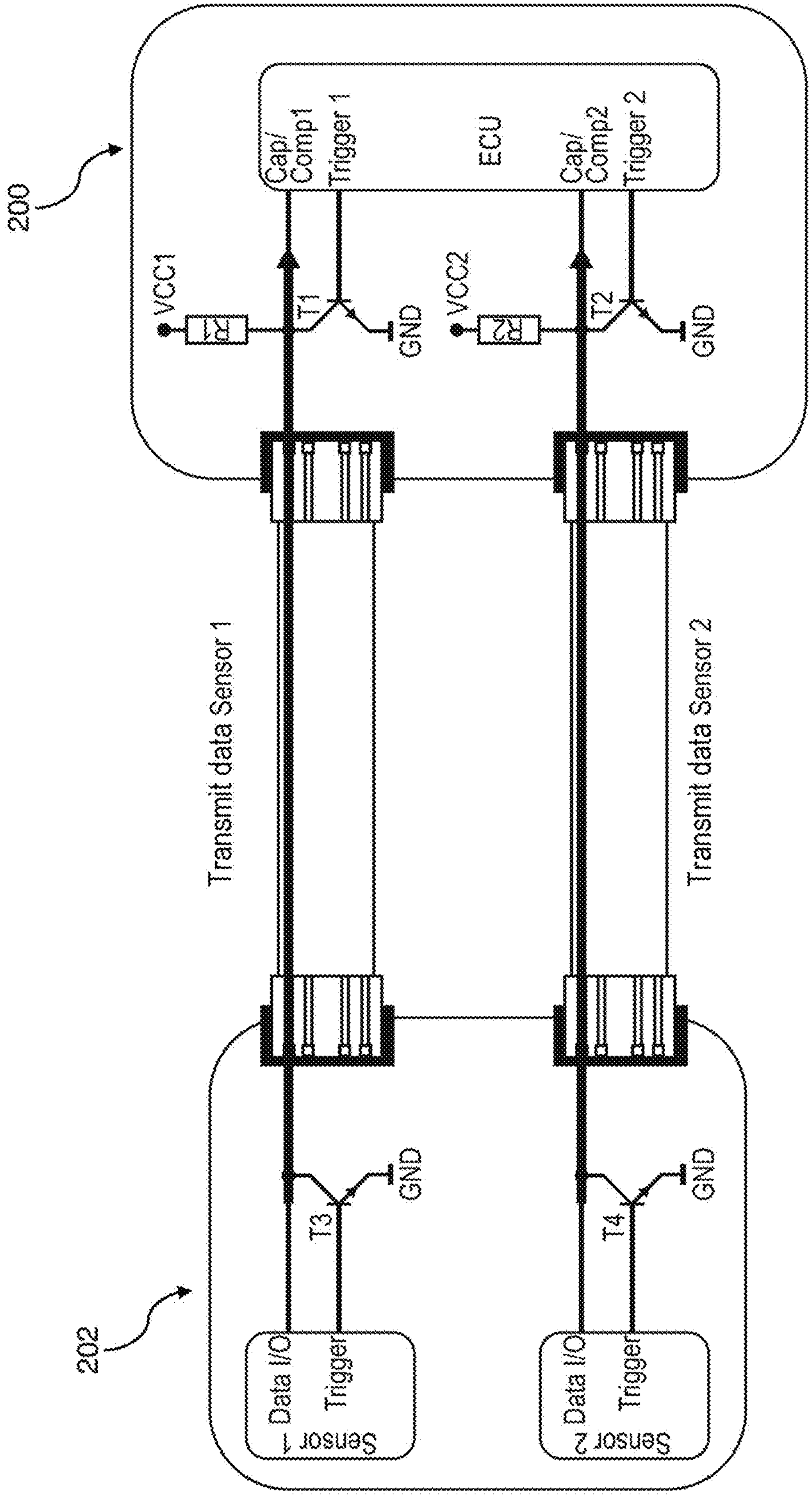

FIG. 2*d* shows a data transfer from the respective sensors. The data transfer is enabled by a respective trigger event and intended for the control device 200.

Figure 2E:
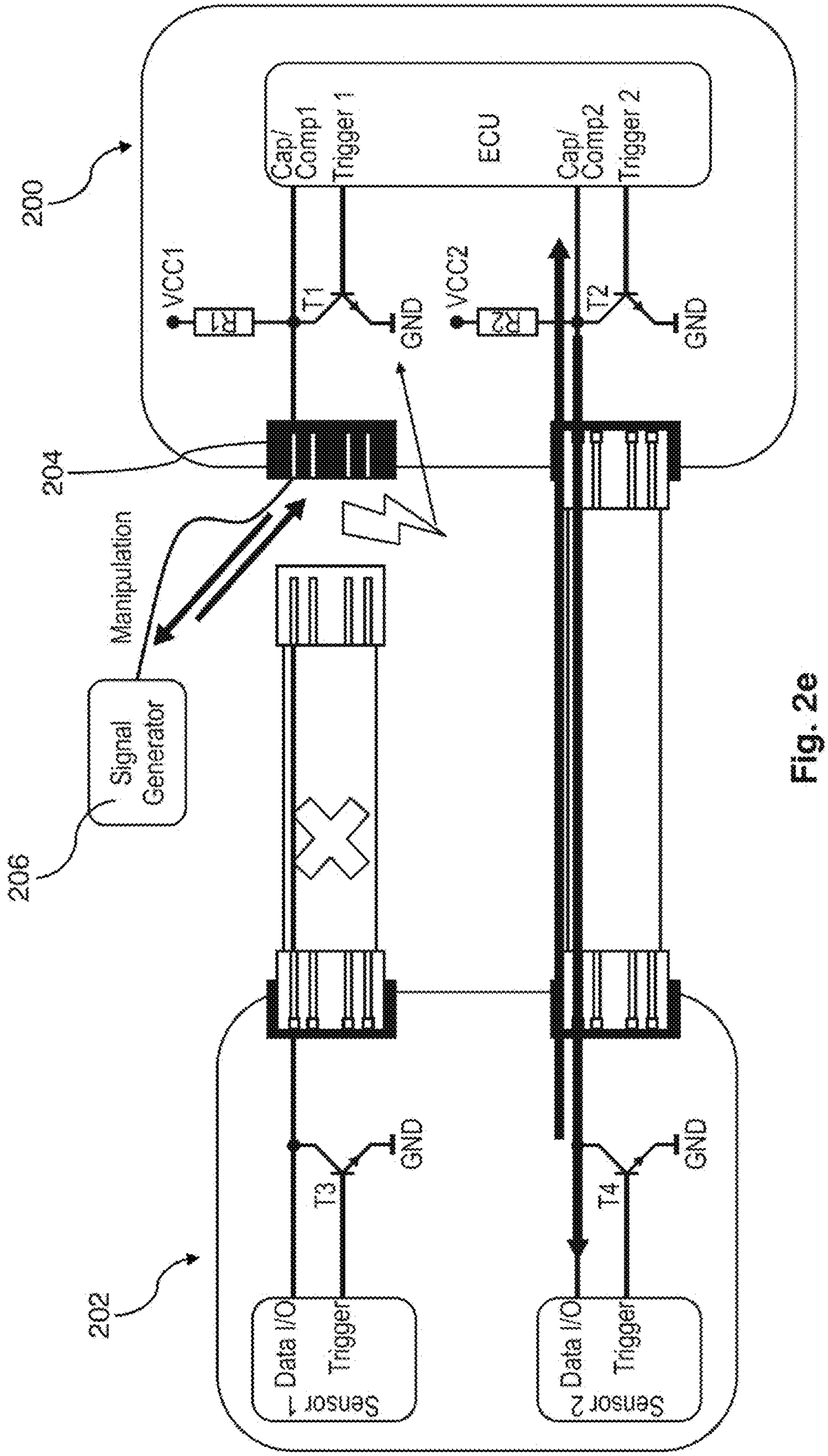

FIG. 2*e* shows an example in which a connection between a first interface module 204 and the on-board electrical system has been released. In addition, an external hardware component 290 has been connected to the first interface module 204. Based on the signal paths illustrated in FIG. 2, the control device 200 can be manipulated by means of the external hardware component 290. A control unit according to the present disclosure can therefore be used to increase the security of the on-board electrical system of a vehicle. The use of two control units according to the present disclosure for an on-board electrical system with a redundant part is shown in FIG. 3.

Figure 3A:
FIGS. 3*a*-3*c* illustrate an exemplary embodiment of a signal path structure and an information exchange process according to an embodiment of the invention.
Figure 3B:
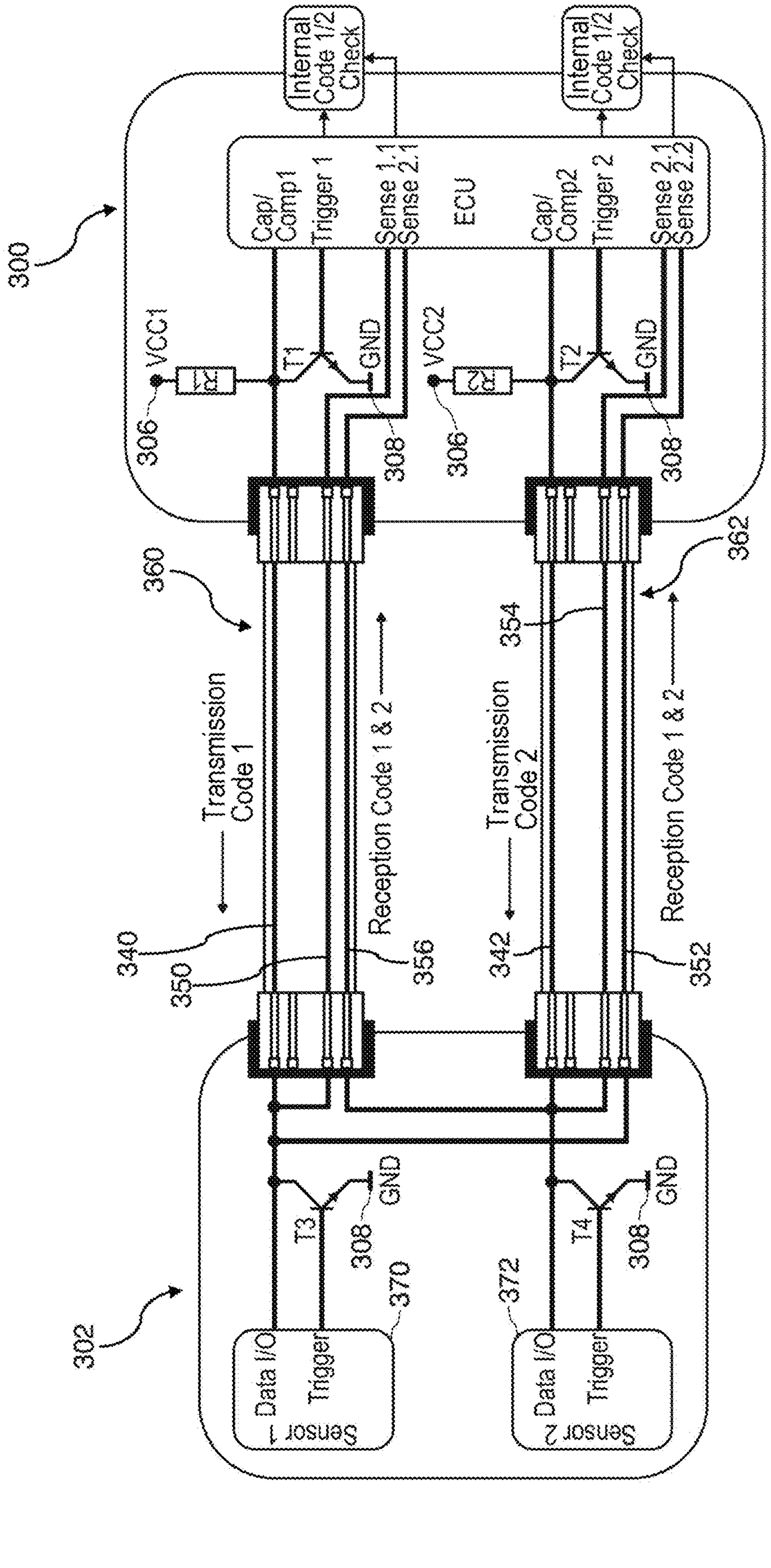
Figure 3C:
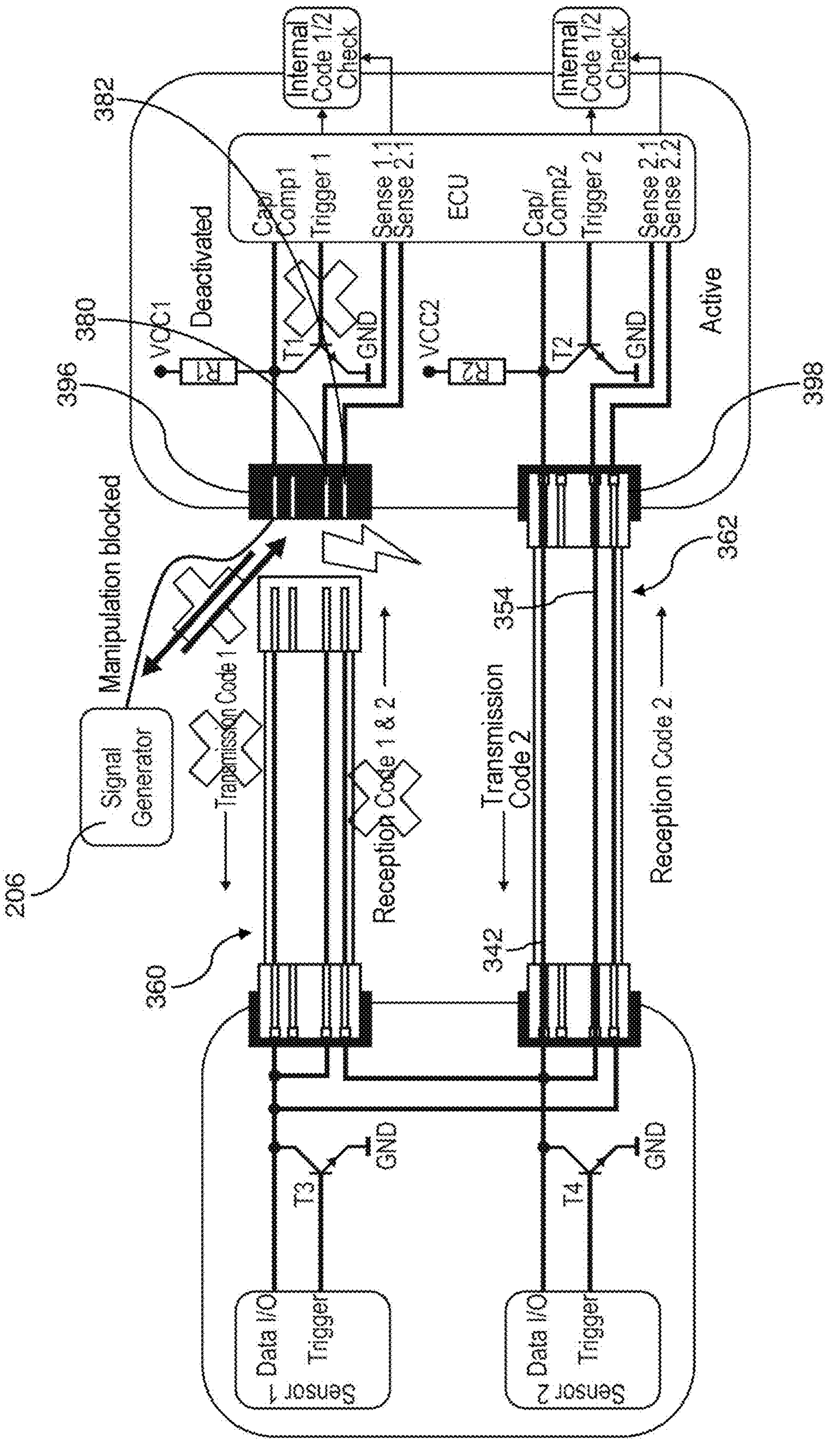

FIGS. 3*a*-3*c* show an exemplary embodiment of a signal path structure according to the present disclosure and an information exchange process according to the present disclosure.

FIG. 3*a* shows a transfer signal based on the request signal (data request) from FIG. 2*b*. The transfer signal also includes a verification parameter.

As shown in FIG. 3*b*, multiple verification signals can be transmitted before the exchange of the sensor data on the connections for a first sensor 370 and a second sensor 372. A verification parameter (as part of the verification signal), that is to say an individual random digital code, can be transmitted via each connection or each signal path 340, 342. The verification signal can be transmitted via the signal path 340 and the further verification signal can be transmitted via the signal path 342. The verification parameters can be received again via separate connections or signal paths 350, 352, 354, 356. The verification parameter can be received via the signal paths 350, 352 and the further verification parameter can be received via the signal paths 354, 356.

Each verification parameter can be returned via both wiring harnesses 360, 362. The control unit 300 can compare the received verification parameters with the "sense" ports, that is to say the assigned interfaces 380, 382. If the verification parameters have been received at the correct interfaces, the control unit 300 can enable the data request and the sensor data transfer. This allows data to be exchanged.

Only the signal transmission, power supply 306 and ground (GND) connections 308 are shown for the purpose of illustration.

FIG. 3*c* shows the disconnection of a part of the control unit 300 in the case of a manipulation. If a connection, that is to say the wiring harness 360, of the first interface module 396 of the control unit 300 is disconnected, for example removed or was not contact-connected, no verification parameter is received at the second interface 380 and the third interface 382. In order to prevent further manipulations, such as signal induction, for example, the control unit 300 can be at least partially deactivated. In particular, a part of the control unit that is connected to the interface module 396 can be deactivated. As an option, system-critical parts of the control unit, for example a drive stage, can be deactivated. Deactivation can occur if the verification parameter received deviates from the transmitted verification parameter or is not received at all.

An induced verification parameter on the sense line is also not accepted by the control unit 300, as the randomly generated verification parameter can also be checked internally in the control unit.

Removing the two wiring harnesses 360, 362 can block both drive stages and prevent complete communication. The control unit 300 can then switch to a secure mode, for example go offline. The control unit 300 can thus be fully deactivated.

It can also detect the loss of a connector or the improper insertion of a connector. As a result, a faulty connection cannot affect the fault-tolerant strategy and diagnostics integrated in the control unit 300 during operation.

For example, only one defective interface can also be identified selectively. For example, the control unit can obtain both verification parameters via the second interface module 398 and obtain the first verification parameter via the first interface module only at the second interface 380. Accordingly, the control unit 300 could determine that the third interface 382 is defective.

Even if the exemplary embodiments describe that the verification signal also includes data other than the verification parameter, the verification signal is not restricted to this. As an alternative, the verification signal may not be based on a request signal of the prior art. For example, the verification signal may only include the verification parameter. This means that the verification parameter can be transmitted separately from other data, for example a data request.

Figure 4:
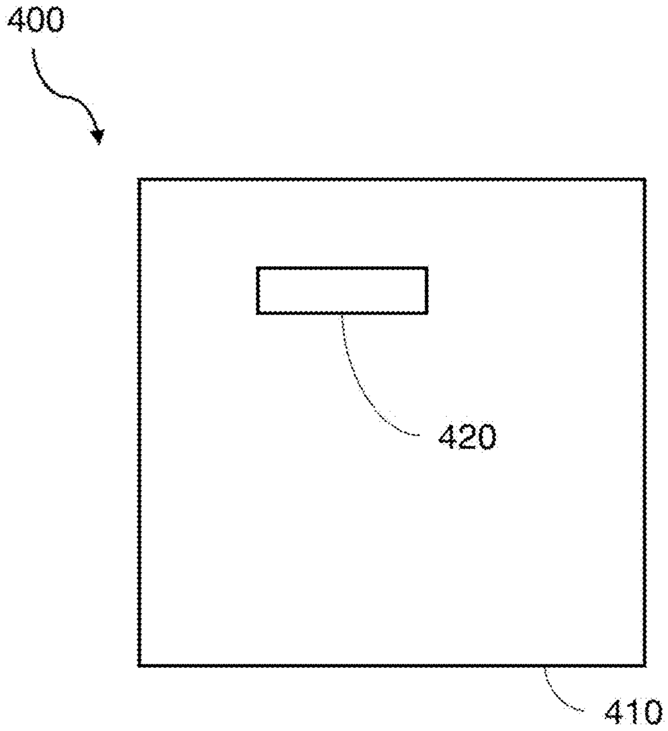
FIG. 4 illustrates an exemplary embodiment of a vehicle.

FIG. 4 shows an exemplary embodiment of a vehicle 400. The vehicle comprises a steering actuator 410 which is designed to drive a steering axle of the vehicle 400. The steering actuator 410 or the vehicle 400 comprises a control unit 420, as described for example with reference to FIG. 1. Particularly in the area of application of a vehicle, the control unit 420 according to the present disclosure has additional advantages: Security of the on-board electrical system of the vehicle 400 can be improved. A manipulation of a connection between different components of the vehicle 400, for example a wiring harness, can be made more difficult.

Figure 5:
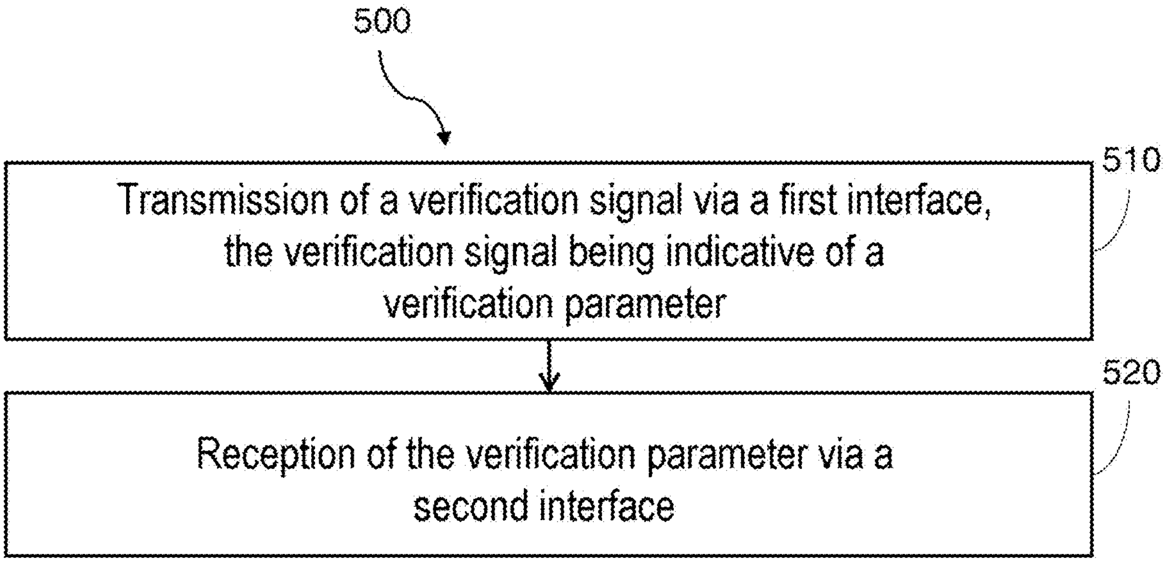
FIG. 5 illustrates a block diagram of an exemplary embodiment of a method.

FIG. 5 shows a block diagram of an exemplary embodiment of a method 500. The method 500 is for a control unit for a control system of a vehicle. The method 500 comprises transmission 510 of a verification signal via a first interface, the verification signal being indicative of a verification parameter. The method 500 furthermore comprises reception 520 of the verification parameter via a second interface. The first interface is different from the second interface. The method can be carried out by a control unit as described above, for example with reference to FIG. 1.

Further exemplary embodiments are computer programs for carrying out a method described herein when the computer program runs on a computer, a processor, or a programmable hardware component. Depending on specific implementation requirements, exemplary embodiments of the present disclosure can be implemented in hardware or in software. The implementation can be carried out using a digital storage medium, for example a floppy disk, a DVD, a Blu-ray disc, a CD, a ROM, a PROM, an EPROM, an EEPROM or a FLASH memory, a hard disk, or other magnetic or optical memory which stores electronically readable control signals that can interact with or interact with a programmable hardware component in such a way that the respective method is carried out.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS (PART OF THE DESCRIPTION)

130 Control unit
**132*a*** First interface
**132*b*** Second interface
134 Data processing circuit
136 Memory
200 Control device
202 Sensor system
204 Connecting element
206 Power supply
208 Ground connection
300 Control unit
302 Sensor system
306 Power supply
308 Ground connection
360, 362 Wiring harness
340, 242 Signal path verification signal
350, 352, 354, 356 Signal path verification parameters
370, 372 Sensor
396, 398 Interface
400 Vehicle
410 Steering actuator
420 Control unit
500 Method for a control unit
510 Transmission of a verification signal
520 Reception of a verification parameter

The invention claimed is:

1. A control unit for a control system of a vehicle, comprising:
a first interface;
a second interface; and
a data processing circuit configured to:
control the first interface and the second interface,
transmit a verification signal via the first interface, wherein the verification signal is indicative of a verification parameter, and
receive the verification parameter from the second interface in response to transmitting the verification signal via the first interface.

2. The control unit as claimed in claim 1, wherein the data processing circuit is configured to deactivate a part of the control system if the verification parameter is not received by the data processing circuit via the second interface within a predefined time after transmission of the verification signal by the data processing circuit via the first interface.

3. The control unit as claimed in claim 1, wherein the first interface and the second interface are comprised by an interface module, wherein the control unit comprises a further interface module comprising a further interface, wherein the data processing circuit is configured to:

transmit a further verification signal indicative of a further verification parameter via the further interface, and receive the further verification parameter from the interface module in response to transmitting the further verification signal via the further interface.

4. The control unit as claimed in claim 3, wherein the further verification parameter is received via the second interface or a third interface.

5. The control unit as claimed in claim 3, wherein only a part of the control system that correlates to the verification parameter or the further verification parameter is deactivated if the verification parameter or the further verification parameter is not received via the interface module within a predefined time after transmission of the verification signal or the further verification signal.

6. The control unit as claimed in claim 1, wherein the data processing circuit is configured to enable data transfer of sensor data via the interface module only after reception of the verification parameter.

7. A steering actuator for a vehicle, comprising the control unit as claimed in claim 1.

8. A vehicle, comprising the control unit as claimed in claim 1.

9. A method for securely transmitting and receiving data via a control unit for a control system of a vehicle, comprising:

transmitting a verification signal via a first interface, the verification signal being indicative of a verification parameter; and receiving the verification parameter via a second interface in response to transmitting the verification signal via the first interface.

10. A non-transitory computer-readable medium having processor-executable instructions stored thereon, wherein the processor-executable instructions, when executed by one or more processors, facilitate performance of the method of claim 9.

11. The control unit as claimed in claim 1, wherein the verification signal is configured to verify connectivity between the control unit and a sensor.

12. The control unit as claimed in claim 11, wherein the verification parameter is configured to verify a correct connection between the control unit and a component of a vehicle.

13. The control unit as claimed in claim 12, wherein the verification parameter is a data structure.

14. The control unit as claimed in claim 12, wherein the verification parameter is an identifier.

* * * * *